Aug. 27, 1957 H. C. ROTERS 2,804,557
ALTERNATING-CURRENT MOTOR
Filed Jan. 31, 1956.
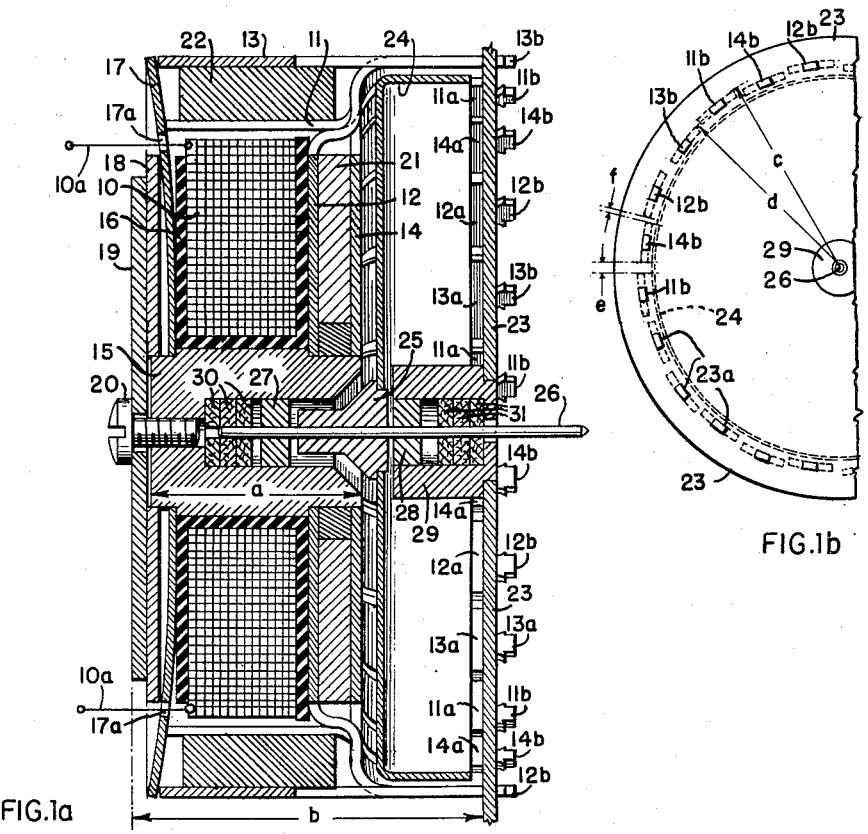
FIG.1a
FIG.1b
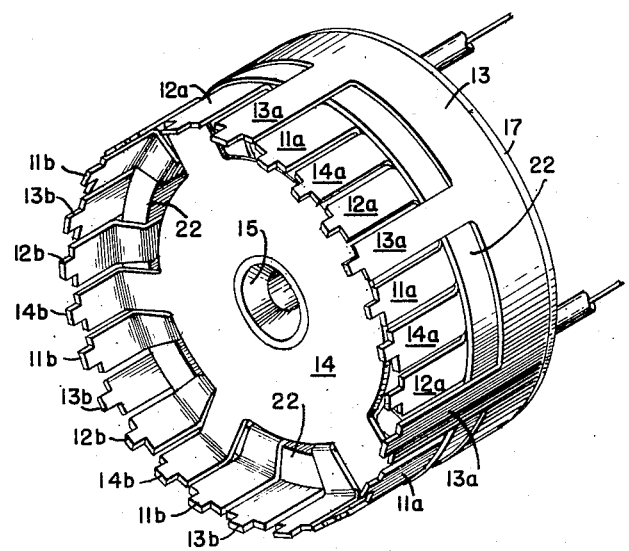
FIG.2

United States Patent Office 2,804,557
Patented Aug. 27, 1957

2,804,557

ALTERNATING-CURRENT MOTOR

Herbert C. Roters, Kew Gardens, N. Y., assignor to General Time Corporation, New York, N. Y., a corporation of Delaware Application January 31, 1956, Serial No. 562,408

7 Claims. (Cl. 310—164)

This invention relates to alternating-current motors and, while it is of general application, it is particularly suitable for embodiment in micropower shaded-pole motors, such as used in electric clocks, timers, and the like, and it will be specifically described in such an embodiment.

In certain micropower motors it has been the practice to provide magnetic circuits terminating in a series of axially extending interleaves pole pieces arranged to form a generally cylindrical structure within which the rotor is disposed. This structure has the advantage that the speed of rotation is relatively low, minimizing the requirements on the gear-reducing drive from the motor, and is quite satisfactory for many applications where low cost is an important consideration.

However, there are certain limitations on the design of a motor of the type described when more rigid standards of performance and longer life are required. For example, the magnetic circuits are generally in the form of stamped or drawn sheet metal elements so that the extending pole pieces are relatively flexible. The result of such flexibility is that the pole pieces are readily set in vibration, resulting in undesirable noise. Also, such pole pieces are relatively easily deformed from their ideal positions, resulting in variations in the air gap, magnuetic field, and torque around the periphery of the motor. These variations also tend to develop vibration and noise. With this construction, also, the rotor has customarily overhung the nearest bearing, which has been located within the field winding near the point of highest temperature of the motor, thus reducing the bearing life, which is a limiting factor on the life of the motor. Another limitation upon this design of motor is the relative difficulty or impossibility of replacing a field winding after burn-out or other defect. Usually in a motor of such construction, if it is attempted to remove sufficient of the fastenings to remove the field winding, the motor assembly falls compleetly apart and cannot readily be reassembled without special jigs and fixtures, which are impractical for individual service work.

It is an object of the present invention, therefore, to provide a new and improved alternating-current motor of the type described, which obviates one or more of the above-mentioned limitations on prior motors of this type.

It is another object of the invention to provide a new and improved alternating-current motor of the type described which embodies one or more of the following advantages:

(a) Accurate location of the pole tips with respect to the rotor, thereby ensuring minimum eccentricity between the rotor and the stator and minimum variations in air gap, magnetic field, and output torque around the periphery of the motor;

(b) Minimum vibration of the pole pieces, contributing to a minimum motor noise;

(c) Use of metal stampings of thinner gauge;

(d) Location of one motor bearing completely outside of the motor field member;

(e) Ready removal of the field winding for replacement and repair without disassembly of other motor elements.

In accordance with the invention, there is provided an alternating-current motor comprising field winding means, a first magnetic circuit for the field winding means including a pair of pole pieces each having a plurality of axially extending pole tips, and a second magnetic circuit for the field winding means also including a pair of pole pieces each having a plurality of axially extending pole tips. The pole tips of all of the pole pieces have axially extending tabs and are disposed in an array to form a generally cylindrical structure. The motor also comprises means for causing the phase of the field of one of said magnetic circuits to be displaced with respect to the other and the pole tips of the magnetic circuits are interleaved to form a multi-phase magnetic field with a plurality of pole pairs. The motor further comprises a supporting frame plate having a circular array of accurately spaced apertures into which the pole-tip tabs are firmly secured, accurately to determine the positioning of the pole tips, and a cylindrical rotor element disposed within and in juxtaposition to the array of pole tips.

For a better understanding of the present invention, together with other and further objects thereof, reference is had to the following description taken in connection with the accompanying drawing, while its scope will be pointed out in the appended claims.

Referring now to the drawing:

Fig. 1a is a cross-sectional view of an alternating-current motor constructed in accordance with the invention;

Fig. 1b is a reduced fragmentary end view of the motor of Fig. 1a, showing the relationship between the magnetic pole pieces and the rotor; while Fig. 2 is a perspective view of the laternating-current motor of Fig. 1a with the frame plate and rotor removed.

Referring now more particularly to the drawing, there is represented an alternating-current motor comprising a field winding means such as the single field winding 10. This winding is mounted on an insulation spool 16 and is provided with two magnetic circuits. The first magnetic circuit includes a pair of unshaded pole pieces 11 and 12 having a plurality of axially extending pole tips 11a and 12a, respectively. The field winding 10 is also provided with a second magnetic circuit including a pair of pole pieces 13, 14 also having a plurality of axially extending pole tips 13a, 14a, respectively. The magnetic circuits 11, 12, and 13, 14 comprise a central magnetic core 15 on which the field winding 10 and its insulation spool 16 are disposed.

Each of the magnetic circuits 11, 12 and 13, 14 effectively comprises a pair of nested, cup-shaped members terminating in its respective pair of pole pieces. For example, each of the pole pieces 12, 14 is a cup-shaped member, which may be a stamped or drawn sheet metal member, closely engaging the central core 15. Each of the magnetic pole pieces 11, 13 is in the form of an annular magnetic member of stamped or drawn sheet metal and a common disc-like magnetic assembly bridging the core 15 and the annular members 11, 13. This latter assembly comprises resilient discs 17 and 18 of magnetic material closely fitting the central core 15 and a retaining disc 19 secured to the end of the core 15 by a clamping screw 20. The disc 17 may be provided with apertures 17a, 17a through which pass connections 10a to the field winding 10. The screw 20 is effective to clamp the disc assembly 17, 18, and 19 firmly to engage the corresponding ends of the pole pieces 11, 13 and thus complete a low-reluctance magnetic circuit for them. The screw 20 may be removed to permit removal and replacement of the field winding 10. If removal of the field winding is not desired, the magnetic pole pieces 11, 13 and discs 17, 18 may be integral cup-shaped members of the same general character as the pole pieces 12, 14.

The pole tips of all of the pole pieces have axially extending tabs 11b, 12b, 13b, and 14b, respectively, and are disposed in an array to form a generally cylindrical structure. As shown in Fig. 1b, the mean diameter of the array of pole tips 11b, 12b of the unshaded magnetic circuit 11, 12 is greater than that of the array 13b, 14b of the magnetic circuit 13, 14 which, as described hereinafter, is shaded. By this construction, the otherwise unequal strengths of the fields of the shaded and unshaded magnetic circuits are substantially equalized.

The alternating-current motor of the invention also includes means for causing the phase of the field of one of the magnetic circuits to be displaced with respect to the other. Specifically, the magnetic circuit comprising the pole pieces 13 and 14 is provided with shading coil means such as a shading disc 21 and an annular shading ring 22. The pole tips 11a, 12a, 13a, and 14a of the magnetic circuits are interleaved, as shown most clearly in Fig. 2, to form a multiphase magnetic field with a plurality of pole pairs.

The motor of the invention also includes a supporting frame plate 23 of non-magnetic material having a circular array of accurately spaced apertures 23a into which the pole-tip tabs are firmly secured, accurately to determine the position of the pole tips. For example, the pole-tip tabs may closely fit the apertures of plate 23 and then be staked to secure them in position, as shown in exaggerated degree in Fig. 1a.

The motor of the invention also includes a cylindrical rotor element 24 disposed within and in juxtaposition to the array of pole tips. The rotor 24 is actually cup-shaped in form and secured to a hub 25 mounted on a rotor shaft 26. The cylindrical rim of the rotor 24 is preferably formed of a magnetic material having a high hysteretic constant such as a chromium or tungsten alloy permanent magnet steel. The rotor shaft is provided with a sleeve bearing 27 mounted within the central core 15 and a second sleeve bearing 28 mounted within a hub 29 secured to the frame plate 23, this latter bearing being completely outside of the magnetic circuits of the motor. Suitable lubricant retaining pads or washers 30, 31 are provided adjacent the bearings 27, 28, respectively.

While the motor of the invention may be constructed in a wide range of sizes and forms, there follow the specifications of one satisfactory example of the motor of the invention, the lettered dimensions referring to Figs. 1a and 1b of the drawing:

Stator:
- Dimension (a) _____ 0.412 inch.
- Dimension (b) _____ 0.695 inch.
- Outer diameter (c) ____ 1.450 inches.
- Outer diameter (d) ____ 1.430 inches.
- Pole tips _____ 0.160 inch wide.
- Spacing (e) _____ 0.035 inch.
- Spacing (f) _____ 0.005 inch.
- Members 11-14 _____ 0.020 inch thick soft steel sheets.
- Core 15 _____ 0.3125 inch diameter soft steel rod.

Rotor 24 _____ Permanent magnet steel alloy comprising essentially 1.21% carbon, 1.27% tungsten, 0.26% manganese, and 0.22% silicon and commercially available as "Athenia" hack saw steel.
- Outer diameter _____ 1.360 inches.
- Wall thickness _____ 0.0075 inch.

Thus it will be seen that the motor described above has a number of distinct advantages. The pole tips 11a, 12a, 13a, and 14a are held rigidly and accurately in position by their respective tabs 11b, 12b, 13b, and 14b, respectively, which are securely staked in apertures in the frame plate 23. This accurate location of the pole tips with respect to the rotor bearing 28, also supported from the frame plate 23, minimizes any eccentricity between the rotor 24 and the pole tips. As a result, variations in the air gap, the magnetic field, and the output torque around the periphery of the motor are minimized, thus also reducing motor noise, which is often caused by variations in torque and side pull on the rotor which result in knocking of the rotor in its bearings. Vibration of the relatively flexible pole tips, an important source of noise in a motor of this type, is also minimized. At the same time, fixing of the positions of the pole tips permits the use of lower cost, thinner gauge metal stampings. Also, since the bearing 28 is located outside of the main stator assembly, it runs at a much lower temperature, resulting in quieter operation and longer life.

The staking of the pole tips 11a, 12a, 13a, and 14a in the frame plate 23 also retains the motor elements in their proper relative positions upon removal of the screw 20 and the magnetic assembly 17, 18, and 19, thus facilitating removal and replacement of the field winding 10.

While there has been described what is at present considered to be the preferred embodiment of the invention it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An alternating-current motor comprising: field winding means; a first magnetic circuit for said winding means including a pair of pole pieces each having a plurality of axially extending pole tips; a second magnetic circuit for said winding means including a pair of pole pieces each having a plurality of axially extending pole tips; the pole tips of all of said pole pieces having axially extending tabs and being disposed in an array to form a generally cylindrical structure; means for causing the phase of the field of one of said magnetic circuits to be displaced with respect to the other the pole tips of said magnetic circuits being interleaved to form a multiphase magnetic field with a plurality of pole-pairs; a supporting frame plate having a circular array of accurately spaced apertures into which said pole-tip tabs are firmly secured, accurately to determine the positioning of said pole tips; and a cylindrical rotor element disposed within and in juxtaposition to said array of pole tips.

2. An alternating-current motor comprising: a field winding; a first magnetic circuit for said winding including a pair of pole pieces each having a plurality of axially extending pole tips; a second magnetic circuit for said winding means including a pair of pole pieces each having a plurality of axially extending pole tips; the pole tips of all of said pole pieces having axially extending tabs and being disposed in an array to form a generally cylindrical structure; shading coil means for one of said magnetic circuits; the pole tips of said magnetic circuits being interleaved to form a multiphase magnetic field with a plurality of pole-pairs; a supporting frame plate having a circular array of accurately spaced apertures into which said pole-tip tabs are firmly secured accurately to determine the positioning of said pole tips; and a cylindrical rotor element disposed within and in juxtaposition to said array of pole tips.

3. An alternating-current motor comprising: field winding means; a first magnetic circuit for said winding means including a pair of pole pieces each having a plurality of axially extending pole tips; a second magnetic circuit for said winding means including a pair of pole pieces each having a plurality of axially extending pole tips; each of said magnetic circuits comprising effectively a pair of nested cup-shaded members terminating in its respective pair of pole pieces and said magnetic circuits having a common central magnetic core on which said field winding means is disposed, the pole tips of all of said pole pieces having axially extending tabs and being disposed in an array to form a generally cylindrical structure; means for causing the phase of the field of one of said magnetic circuits to be displaced with respect to the other; the pole tips of said magnetic circuits being interleaved to form a multiphase magnetic field with a plurality of pole-pairs; a supporting frame plate having a circular array of accurately spaced apertures into which said pole-tip tabs are firmly secured accurately to determine the positioning of said pole tips; and a cylindrical rotor element disposed within and in juxtaposition to said array of pole tips.

4. An alternating-current motor comprising: a field winding; a first magnetic circuit for said winding including a pair of pole pieces each having a plurality of axially extending pole tips; a second magnetic circuit for said winding means including a pair of pole pieces each having a plurality of axially extending pole tips; shading coil means for one of said magnetic circuits; the pole tips of all of said pole pieces having axially extending tabs and being disposed in an array to form a generally cylindrical structure and the mean diameter of the array of pole tips of said unshaded magnetic circuit being greater than that of the array of said shaded circuit; the pole tips of said magnetic circuits being interleaved to form a multiphase magnetic field with a plurality of pole-pairs; a supporting frame plate having a circular array of accurately spaced apertures into which said-pole-tip tabs are firmly secured accurately to determine the positioning of said pole tips; and a cylindrical rotor element disposed within and in juxtaposition to said array of pole tips.

5. An alternating-current motor comprising: field winding means; a first magnetic circuit for said winding means including a pair of pole pieces each having a plurality of axially extending pole tips; a second magnetic circuit for said winding means including a pair of pole pieces each having a plurality of axially extending pole tips; the pole tips of all of said pole pieces having axially extending tabs and being disposed in an array to form a generally cylindrical structure; means for causing the phase of the field of one of said magnetic circuits to be displaced with respect to the other; the pole tips of said magnetic circuits being interleaved to form a multiphase magnetic field with a plurality of pole-pairs; a supporting frame plate having a circular array of accurately spaced apertures into which said pole-tip tabs are firmly secured accurately to determine the positioning of said pole tips; a cylindrical rotor element disposed within and in juxtaposition to said array of pole tips and having a rotor shaft; and a bearing for said shaft supported from said frame plate.

6. An alternating-current motor comprising: field winding means; a first magnetic circuit for said winding means including a pair of pole pieces each having a plurality of axially extending pole tips; a second magnetic circuit for said winding means including a pair of pole pieces each having a plurality of axially extending pole tips; said magnetic circuits comprising a common central magnetic core on which said field winding means is disposed and a pair of annular magnetic members individual thereto and a disc-like magnetic assembly bridging said core and said annular members, said magnetic assembly being removably secured to said core to permit removal and replacement of said field winding means; the pole tips of all of said pole pieces having axially extending tabs and being disposed in an array to form a generally cylindrical structure; means for causing the phase of the field of one of said magnetic circuits to be displaced with respect to the other; the pole tips of said magnetic circuits being interleaved to form a multiphase magnetic field with a plurality of pole-pairs; a supporting frame plate having a circular array of accurately spaced apertures into which said pole-tip tabs are firmly secured accurately to determine the positioning of said pole tips; and a cylindrical rotor element disposed within and in juxtaposition to said array of pole tips.

7. An alternating-current motor comprising: field winding means; a first magnetic circuit for said winding means including a pair of pole pieces each having a plurality of axially extending pole tips; a second magnetic circuit for said winding means including a pair of pole pieces each having a plurality of axially extending pole tips; said magnetic circuits comprising a common central magnetic core on which said field winding means is disposed and a pair of annular magnetic members individual thereto and a disc-like magnetic assembly bridging said core and said annular members and including a stressed dished disc element for ensuring magnetic contact between said assembly, said central core and said pair of annular magnetic members, said magnetic assembly being removably secured to said core to permit removal and replacement of said field winding means; the pole tips of all of said pole pieces having axially extending tabs and being disposed in an array to form a generally cylindrical structure; means for causing the phase of the field of one of said magnetic circuits to be displaced with respect to the other; the pole tips of said magnetic circuits being interleaved to form a multiphase magnetic field with a plurality of pole-pairs; a supporting frame plate having a circular array of accurately spaced apertures into which said pole-tip tabs are firmly secured accurately to determine the positioning of said pole tips; and a cylindrical rotor element disposed within and in juxtaposition to said array of pole tips.

References Cited in the file of this patent

UNITED STATES PATENTS

| | | |
|---|---|---|
| 2,292,265 | Carpenter | Aug. 4, 1942 |
| 2,492,197 | Schellens | Dec. 27, 1949 |

FOREIGN PATENTS

| | | |
|---|---|---|
| 477,835 | Great Britain | Jan. 3, 1938 |